US010810420B2

(12) United States Patent
Bhatnagar et al.

(10) Patent No.: US 10,810,420 B2
(45) Date of Patent: Oct. 20, 2020

(54) DATA EXTRACTION AND DUPLICATE DETECTION

(71) Applicant: AMERICAN EXPRESS TRAVEL RELATED SERVICES COMPANY, INC., New York, NY (US)

(72) Inventors: Lokesh Bhatnagar, Gurgaon (IN); Himanshu Sharad Bhatt, Bengaluru (IN); Manoj Bhokardole, Gurgaon (IN); Gabriella P. Fitzgerald, New York, NY (US); Vinit Jain, Gurgaon (IN); Chetan Lohani, Gurgaon (IN); Shachindra Pandey, Gurgaon (IN); Gunjan Panwar, Delhi (IN); Shourya Roy, Bangalore (IN); Di Xu, Warren, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 158 days.

(21) Appl. No.: 16/185,207

(22) Filed: Nov. 9, 2018

(65) Prior Publication Data
US 2020/0104587 A1      Apr. 2, 2020

(30) Foreign Application Priority Data
Sep. 28, 2018   (IN) .............................. 201811036657

(51) Int. Cl.
*G06K 9/68*      (2006.01)
*G06K 9/00*      (2006.01)
*G06F 16/23*     (2019.01)
*G06F 40/216*    (2020.01)
*G06F 40/242*    (2020.01)

(52) U.S. Cl.
CPC ..... *G06K 9/00483* (2013.01); *G06F 16/2365* (2019.01); *G06F 40/216* (2020.01); *G06F 40/242* (2020.01); *G06K 9/00469* (2013.01); *G06K 2209/01* (2013.01)

(58) Field of Classification Search
CPC .. A61K 2300/00; A61K 31/56; A61K 31/573; A61K 31/59; A61K 31/593; A61K 47/06; A61K 47/10; A61K 9/0014; A61P 17/00; A61P 17/06; A61P 17/08; A61P 31/10; A61P 3/02; A61P 43/00; G06F 16/2365; G06F 40/216; G06F 40/242; G06K 2209/01; G06K 9/00469; G06K 9/00483
See application file for complete search history.

(56) References Cited

U.S. PATENT DOCUMENTS

| 10,049,096 B2 * | 8/2018 | Deepak | G06F 40/186 |
|---|---|---|---|
| 2015/0310406 A1 * | 10/2015 | Anderson | G06Q 20/14 |
| 2016/0328610 A1 * | 11/2016 | Thompson | G06Q 10/10 |
| 2018/0114060 A1 * | 4/2018 | Lozano | G06K 9/00483 |
| 2020/0005089 A1 * | 1/2020 | Guruprasad | G06K 9/6256 |

\* cited by examiner

*Primary Examiner* — Xin Jia
(74) *Attorney, Agent, or Firm* — Thomas Horstemeyer, LLP

(57) ABSTRACT

A system provides an end-to-end solution for invoice processing which includes reading invoices (both pdfs and images), extracting key relevant information from the face of invoices, organizing the relevant information in a structured template as a key-value pair, and comparing invoices based on the similarities between different invoice fields to identify potential duplicate invoices.

20 Claims, 6 Drawing Sheets

DATA EXTRACTION AND DUPLICATE DETECTION

CROSS REFERENCE TO RELATED APPLICATIONS

This application claims priority to and the benefit of Indian Patent Application No. 201811036657, filed on Sep. 28, 2018 and entitled "DATA EXTRACTION AND DUPLICATE DETECTION," which is incorporated by reference herein in its entirety for all purposes.

FIELD

The disclosure generally relates to computer systems, and more specifically, to data extraction and document de-duplification.

BACKGROUND

Invoice processing is typically an integral part of a company's operations. Invoice processing often involves extensive manual efforts at different stages such as, for example, scanning invoices, manually entering data into enterprise resource planning systems, de-duplicating against previously paid invoices, etc. Invoices may be produced in multiple formats such as, for example, PDFs, word documents, TIFF, etc. Furthermore, invoices may vary in styles or templates across different vendors. Manually examining such variations and volumes of invoices for correctness, genuineness, and duplicates against historic invoices is usually highly subjective and increases the average cost and time to process an invoice. It is computationally unfeasible for many existing computer systems to detect one-to-many matches among invoices of different formats. As such, processing invoices from multiple sources and formats to organize the key information in a structured manner and identify duplicates creates a technical problem.

SUMMARY

Systems, methods, and articles of manufacture (collectively, the "system") for data extraction and invoice duplicate detection are disclosed. The system may perform operations including receiving an invoice; performing optical character recognition on the invoice; extracting a plurality of key-value pairs from the invoice; generating a structured template comprising the plurality of key-value pairs; forming a feature vector; determining, using a duplicate model and based on the feature vector, that the invoice is a duplicate of a historic invoice in a historic invoice database; receiving an input to the duplicate model indicating an accuracy of the duplicate determination; and modifying, based on the input, the duplicate model.

In various embodiments, forming the feature vector may comprise concatenating similarity measures across different fields. The system may execute a word break algorithm to segment non-space separated words which exist in a reference dictionary. The system may divide a plurality of bigrams in the invoice into categories consisting of (1) both words in a reference dictionary; (2) only first word in the reference dictionary; (3) only second word in the reference dictionary; and (4) neither word in the reference dictionary. The system may perform a table parsing operation on the invoice. The system may save a value and location of a field in the invoice. The system may create a lookup dictionary comprising description keywords.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The system provides an end-to-end solution for invoice processing which includes reading invoices (both pdfs and images), extracting key relevant information from the face of invoices, organizing the relevant information in a structured template as a key-value pair, and comparing invoices based on the similarities between different invoice fields to identify potential duplicate invoices.

A customer (e.g., merchant) may receive invoices from one or more vendors. The invoices may be received in multiple formats (e.g., a native PDF, a paper invoice, a TIFF file, etc.). The customer may invoke a data extraction module operating on one or more servers. For invoices which are in a native PDF format, the data extraction module may convert the PDF to text. The data extraction module may perform a structuring algorithm to convert unstructured text to structured templates. A duplicate detection module may compare the structured text with invoices stored in a historic invoice repository.

The system may enable detection of duplicate invoices. In this regard, merchants may minimize computing resources used to evaluate whether a paper or digital file has been previously received or processed. This may also result in easier accounting, book keeping, expense reporting, reduced disputes, merchant returns, and/or the like. The system may also provide for a reduction in disputes and a reduction in fraud, as a digital copy of documents, invoices, and/or other electronic data may be available in real time or soon after an invoice is received.

This process improves the functioning of the computer, and provides a technical solution to the problem of processing invoices from multiple sources and formats to organize the key information in a structured manner and identify duplicates. For example, by using machine learning to streamline the invoice de-duplification process, the merchant system performs less computer functions and provides less input, which saves on data storage and memory which speeds processing. Additionally, by transmitting, storing, and accessing data using the processes described herein, the security of the data is improved, which decreases the risk of the computer or network from being compromised. By identifying duplicate invoices, this system saves resources and computer processing time which otherwise would be required for repetitive payments of the duplicate invoices or later recovering the payments if identified as duplicates. Additionally, the system can prevent duplicate invoices from getting stored in the system, thereby reducing storage space usage.

Figure 1:
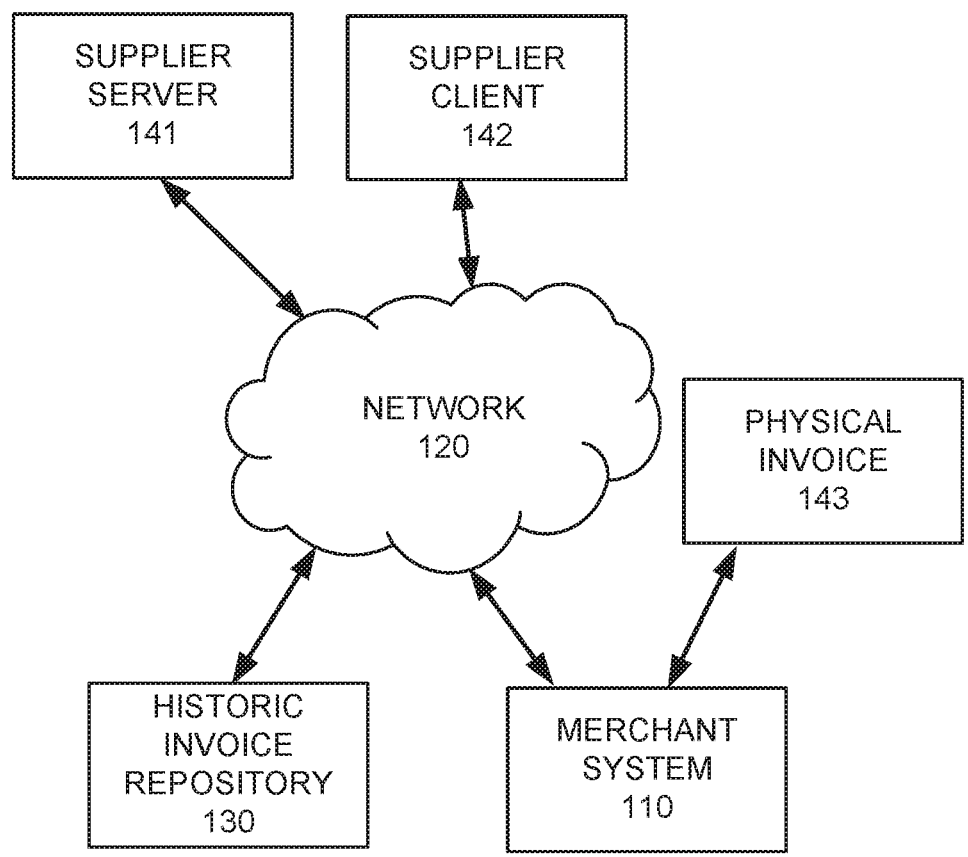
FIG. 1 illustrates an block diagram illustrating various exemplary system components of a system for data extraction and de-duplification, in accordance with various embodiments.

Referring to FIG. 1, a system 100 for invoice de-duplification is disclosed. In various embodiments, the system 100 may be computer based, and may comprise a processor, a tangible non-transitory computer-readable memory, and/or a network interface, along with other suitable system software and hardware components. Instructions stored on the tangible non-transitory memory may allow the system 100 to perform various functions, as described herein. The system 100 may also contemplate uses in association with web services, utility computing, pervasive, and individualized computing, security and identity solutions, autonomic computing, cloud computing, commodity computing, mobility and wireless solutions, open source, biometrics, grid computing and/or mesh computing.

In various embodiments, the system 100 may comprise a merchant system 110. The merchant system 110 may be configured as a central hub to access various systems, engines, and components of the system 100. In that regard, the merchant system 110 may comprise a network, a computer-based system, one or more servers, and/or software components configured to provide an access point to various systems, engines, and components. The merchant system 110 may be in operative and/or electronic communication with various networks 120, a historic invoice repository 130, and one or more invoice sources, such as a supplier server 141, a supplier client computer 142, or a physical invoice 143.

The merchant system 110 may be configured to convert the invoices received from the invoice sources to text. The merchant system 110 may extract key data fields from the invoices and organize the data in a structured manner. The merchant system 110 may compare the key data fields and identify duplicate invoices. Duplicate invoices may be rejected and returned to the supplier. Unique invoices may be processed and stored in the historic invoice repository 130.

Figure 2:
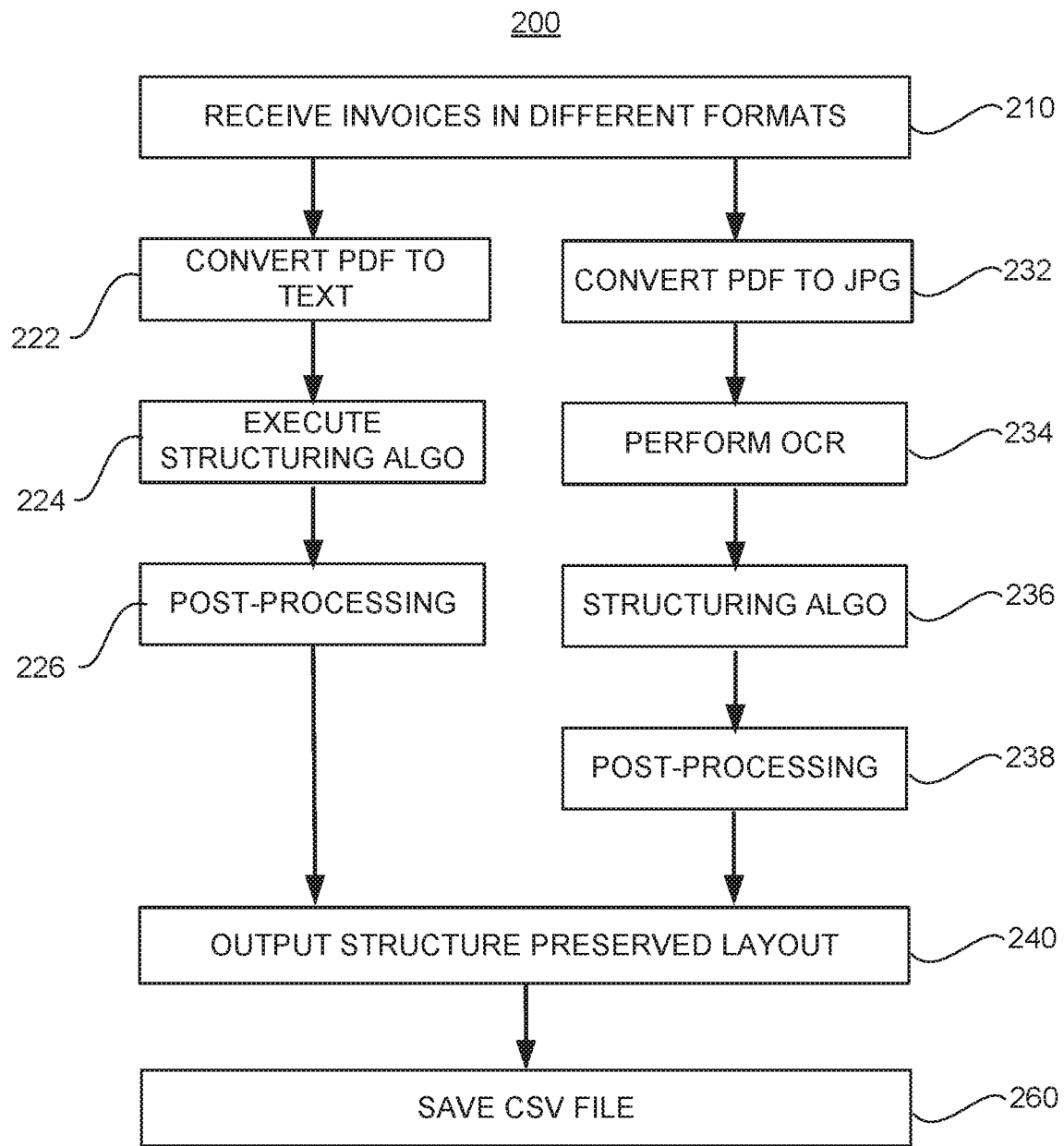
FIG. 2 illustrates an exemplary process flow for data extraction, in accordance with various embodiments.

Referring to FIG. 2, a flowchart of an overview of the process for data extraction is illustrated according to various embodiments. In general, a data extraction module may transform PDF invoices into structured key-value pairs. A merchant may receive a plurality of invoices, which may be from different vendors and in different formats (step 210). For invoices which are in a native PDF format, the merchant system may convert the PDF to text (step 222). A data extraction module may execute a structuring algorithm (step 224). The structuring algorithm may organize each invoice line read from left-to-right. The data extraction module may perform text post-processing operations (step 226). The text post-processing operations may comprise word completion and spelling corrections.

For invoices which are not in a native PDF format, the data extraction module may convert the PDF to a JPG file (step 232). The data extraction module may perform OCR on the JPG file, such as by using Tesseract 4.0 (step 234). The data extraction module may execute a structuring algorithm (step 236). The structuring algorithm may leverage XML-type output from OCR to preserve the structure of the text. The data extraction module may perform text post-processing operations (step 238). The text post-processing operations may comprise semantic text cleansing using language models.

The text post-processing operations may output a structure preserved layout of the invoice text (step 240). The data extraction module may extract relevant key-value pairs and save a structured template as a csv file (step 250). The structured template may be generalized to different invoice templates from different vendors.

Figure 3:
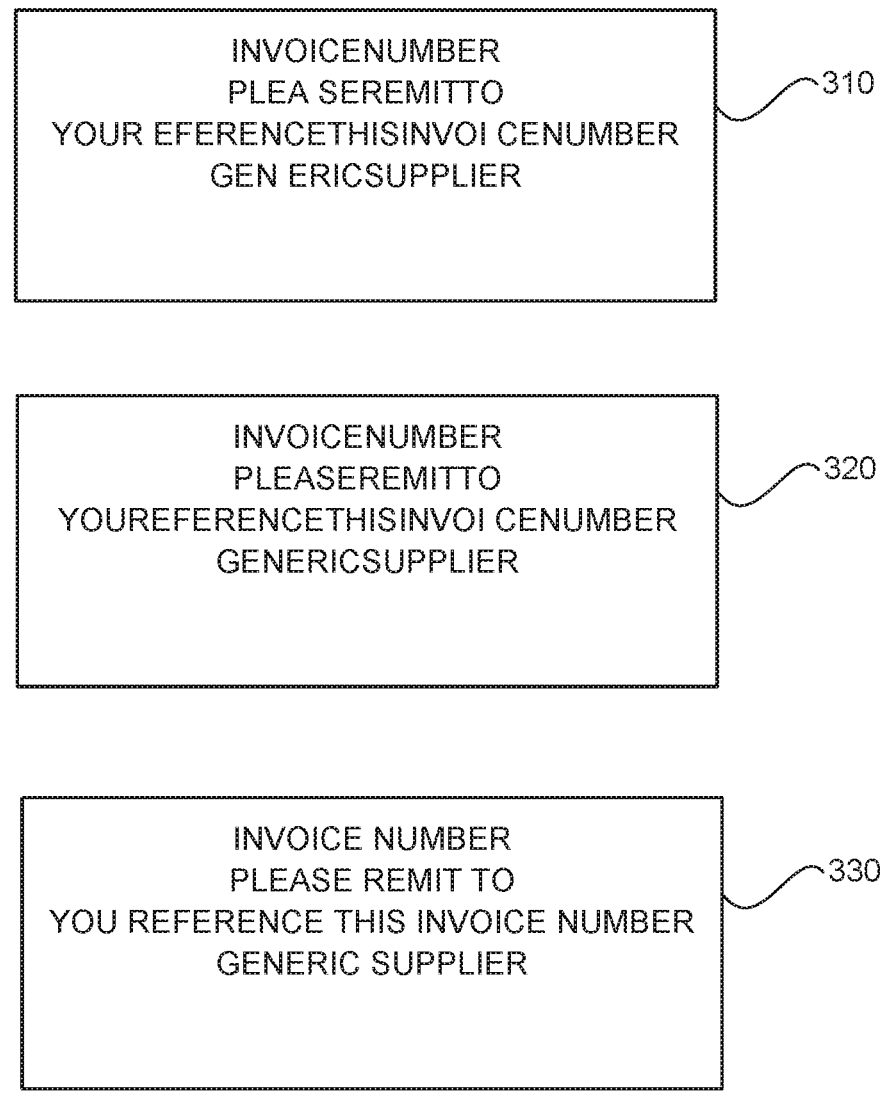
FIG. 3 illustrates an example of a word break algorithm used as part of the text post-processing operations, in accordance with various embodiments.

Referring to FIG. 3, an example of a word break algorithm used as part of the text post-processing operations is illustrated according to various embodiments. Exiting OCR processes may add spaces in incorrect locations, as well as unnecessarily remove spaces, as shown in text block 310. The word break algorithm may remove all spaces from the text block 310, as shown in text block 320. The word break algorithm may segment non-space separated words which exist in a reference dictionary, as shown in text block 330. The word break algorithm may segment unigrams, as well as bigrams and trigrams. A bigram makes a prediction for a word based on the one before, and a trigram makes a prediction for the word based on the two words before that.

Figure 4:
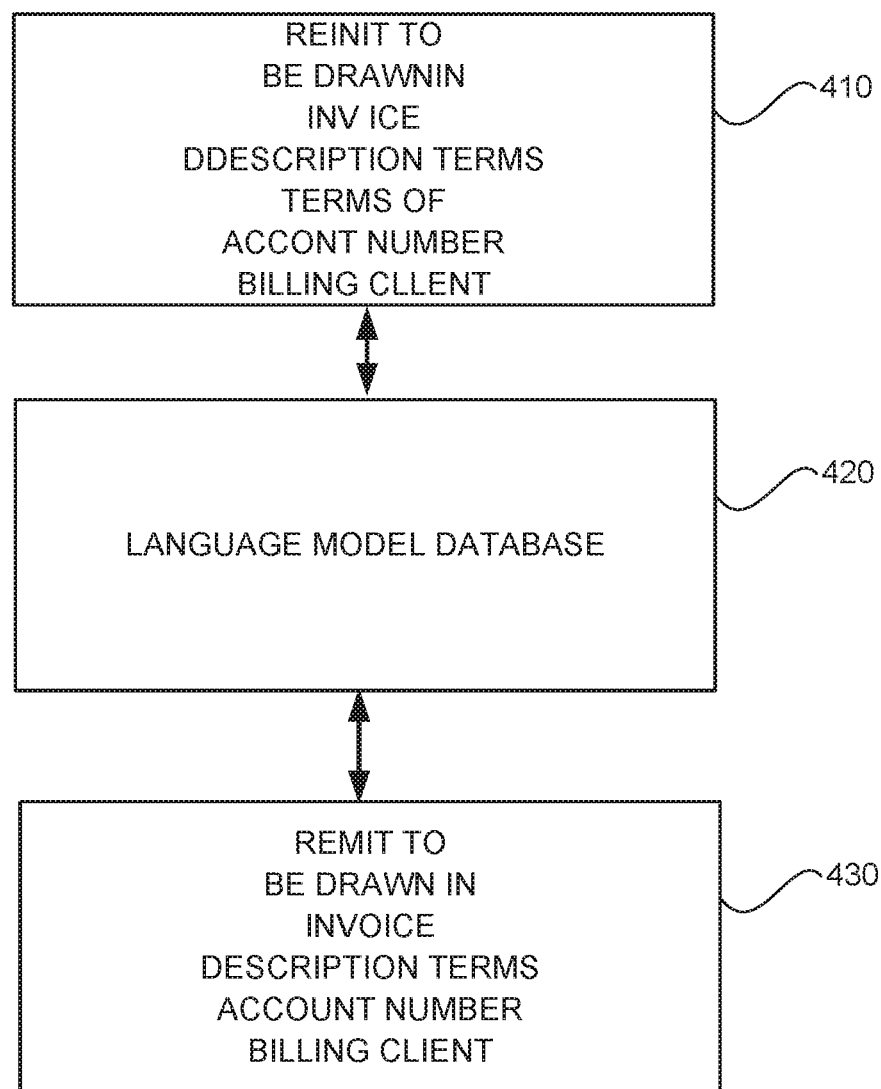
FIG. 4 illustrates an example of a string similarity based algorithm used as part of the text post-processing operations, in accordance with various embodiments.

Referring to FIG. 4, an example of a string similarity based algorithm used as part of the text post-processing operations is illustrated according to various embodiments. The OCR process may introduce one or more errors, such as an incorrect, missing, or additional letter, which may result in words which are not present in the reference dictionary, as shown in text block 410. The string similarity based algorithm may categorize bigrams into one of four categories: (1) Both words in dictionary, e.g., "Terms of" (2) Only first word in dictionary, e.g., "Be drawnin" and "Billing Cllent" (3) Only second word in dictionary, e.g., "Ddescription terms" and "Accont number" and (4) Neither word in dictionary, e.g., "Inv ice." The data extraction module may reference a language model database 420 to identify the most similar bigrams, and the language model may output the correct terms, as shown in text block 430.

Figure 5:
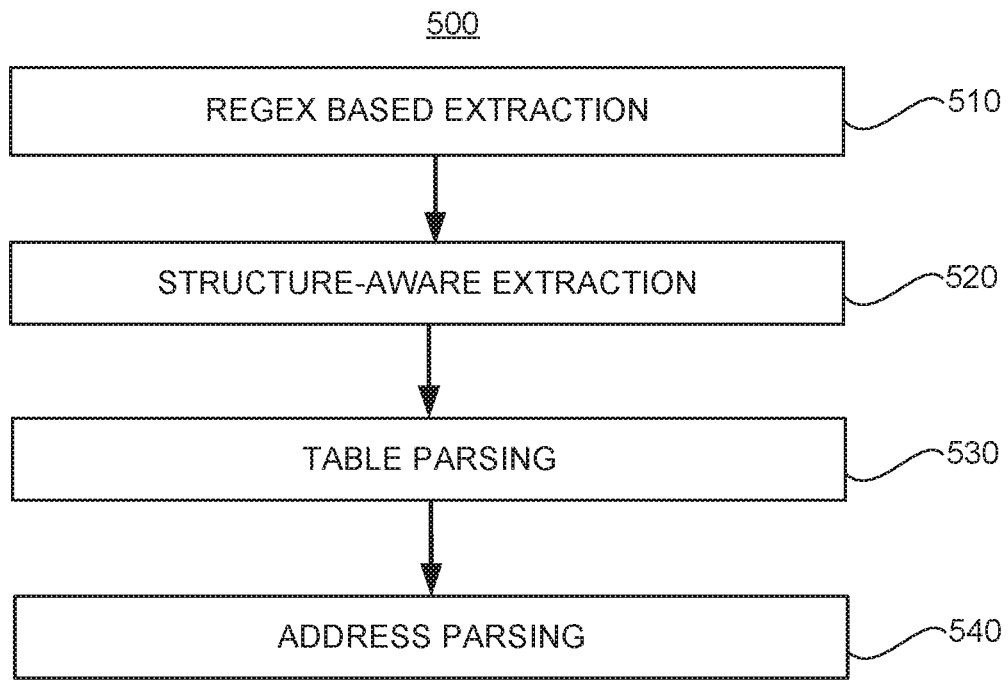
FIG. 5 illustrates an exemplary process flow for data extraction, in accordance with various embodiments.

Referring to FIG. 5, a flowchart 500 of a process for data extraction is illustrated according to various embodiments. The process may include at least one of regular express (REGEX) based extraction (step 510), structure-aware extraction (step 520), table parsing (step 530), or address parsing (step 540).

In step 510, the data extraction module may create regular expressions for all possible variations of different fields, such as invoice number, amount, date, PO number, period, account number, etc. The data extraction module may initialize the value of each field as default and process one line at a time. The data extraction module may apply regular expression based extraction for each field if its value is equal to the default. The data extraction module may check if the extracted values are valid and satisfies the field criteria. If not, the data extraction module may reassign the field value to the default. The data extraction module may apply REGEX to each line in the invoice.

In step 520, the data extraction module may create a field lookup dictionary containing the relevant fields and their possible variations. The data extraction module may process each line of the invoice and look for keywords from the field lookup dictionary. If a line has valid fields, the data extraction module may save the fields and their locations on the invoice. The data extraction module may create candidate key-value pairs based on the spatial location of the fields and the candidate values in the following lines. The data extraction module may apply REGEX to each candidate key-value pair, and the data extraction module may check if the extracted values are valid and satisfy the field criteria.

In step 530, the data extraction module may create a lookup dictionary containing relevant and common description keywords. The data extraction module may extract phrases from document line and identify phrases containing description keywords from the lookup dictionary. For a line to be classified as a valid table header, at least two phrases may have high overlap with description fields, e.g. "Date," "Amount," "Invoice Number," "Description," etc. The data extraction module may save all phrases as column headers along with their spatial locations. The data extraction module may read the next line as a row and extract phrases. The data extraction module may assign phrases to different columns based on the spatial location on the column headers and phrases. The data extraction module may repeat this process for each line below the table headers until the phrases follow the spatial alignment with the columns.

In step 540, the data extraction module may create a lookup dictionary containing the relevant and common address keywords. The data extraction module may extract phrases from each line and identify valid address keywords. The data extraction module may assimilate phrases from the next few lines which could potentially be a part of the corresponding address based on their spatial locations. The data extraction module may create candidate key-value pairs for each candidate. The data extraction module may validate each address by passing it through a regular expression based address parser.

Figure 6:
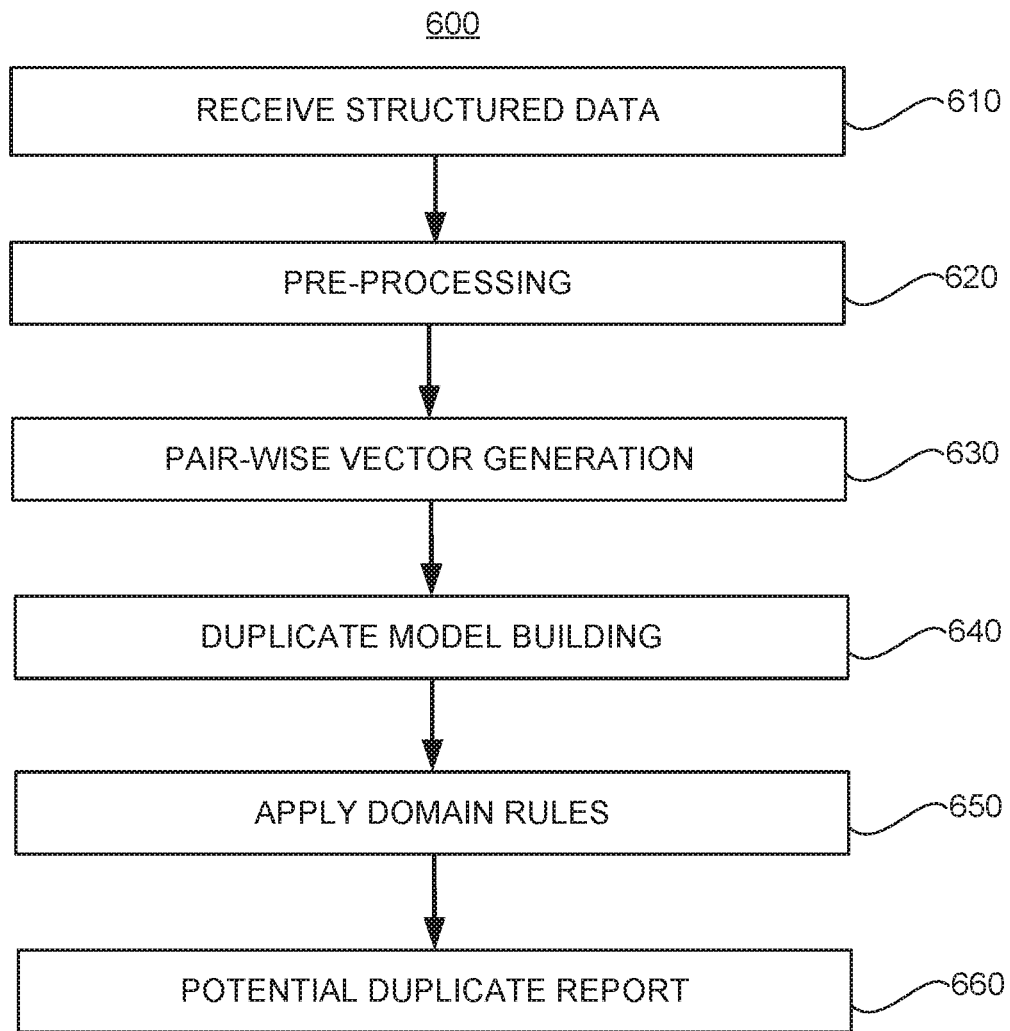
FIG. 6 illustrates an exemplary process flow for duplicate invoice detection, in accordance with various embodiments.

Referring to FIG. 6, a flowchart 600 of a process for duplicate invoice detection is illustrated according to various embodiments. The process may include receiving structured data from daily and historic invoices (step 610), data pre-processing (step 620), pair-wise similarity/feature vector generation (step 630), duplicate model building (step 640), applying domain rules (step 650), generating a potential duplicate review report (step 660).

In step 620, the duplicate detection module may remove special character or white-spaces from field values. The duplicate detection module may bin all addresses into four categories: bill-to, ship-to, remit-to, and others. The duplicate detection module may standardize all dates, amounts, and other field values to a uniform format.

In step 630, the duplicate detection module may pair a test invoice with an invoice from the repository one at a time. The duplicate detection module may compare corresponding fields across two invoices and compute different similarity measures. the duplicate detection module may concatenate all similarity measures across different fields to form a feature vector. The duplicate detection module may repeat this process to generate feature vectors by pairing each test invoice with invoices form the repository.

In step 640, the duplicate detection module may assign a label {0, 1} to the feature vector corresponding to each pair. The value may be a 1 if the pair is a duplicate pair, or a 0 if the pair is not a duplicate. The feature vectors and associated labels may be used as inputs to train a classifying engine. The classifying engine may predict the label {1, 0} for unseen pairs of invoices based on their feature vectors, along with the model reason code.

In step 650, the duplicate detection module may create a set of domain rules to identify duplicates based on the domain expertise from subject matter experts. The duplicate detection module may take the duplicate model's prediction about a pair and run it through the set of domain rules. The duplicate detection module may refine the duplicate model's prediction if it conflicts with any of the domain rules.

In step 660, the duplicate detection module may provide a report containing a potential duplicate pair. An analyst, which may be a human or a machine, may evaluate the duplicate pairs and model reason codes to provide feedback on the duplicate model's performance. The analyst may provide feedback on both false positives and false negatives. The feedback may be provided back to the duplicate model to update and re-train the duplicate model with the corrected labels for the pairs.

For invoices which are determined to be duplicates, the duplicate detection module may reject the invoice, or flag the invoice for further review, such that payment is not improperly sent to the supplier of the invoice. For invoices which are determined to be unique, the duplication detection module may forward the invoice to an accounts payable system for payment to the supplier of the invoice. The invoice may then be stored in the historic invoice database.

By utilizing the processes described herein, entities may decrease the amount of processing capabilities required to compare new invoices to existing invoices, in order to prevent paying multiple times for the same products or services.

The disclosure and claims do not describe only a particular outcome of invoice de-duplification, but the disclosure and claims include specific rules for implementing the outcome of invoice de-duplification and that render information into a specific format that is then used and applied to create the desired results of invoice de-duplification, as set forth in *McRO, Inc. v. Bandai Namco Games America Inc.* (Fed. Cir. case number 15-1080, Sep. 13, 2016). In other words, the outcome of invoice de-duplification can be performed by many different types of rules and combinations of rules, and this disclosure includes various embodiments with specific rules. While the absence of complete preemption may not guarantee that a claim is eligible, the disclosure does not sufficiently preempt the field of invoice de-duplification at all. The disclosure acts to narrow, confine, and otherwise tie down the disclosure so as not to cover the general abstract idea of just invoice de-duplification. Significantly, other systems and methods exist for invoice de-duplification, so it would be inappropriate to assert that the claimed invention preempts the field or monopolizes the basic tools of invoice de-duplification. In other words, the disclosure will not prevent others from invoice de-duplification, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The terms "computer program medium," "computer usable medium," and "computer readable medium" are used to generally refer to media such as removable storage drive and a hard disk installed in hard disk drive. These computer program products provide software to a computer system.

In various embodiments, the servers described herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g., financial payment). For example, a buyer may purchase, lease, rent, barter or otherwise obtain goods from a supplier and pay the supplier using a transaction account.

What is claimed is:

1. A method, comprising:
   receiving, by a computer-based system, an invoice;
   performing, by the computer-based system, optical character recognition on the invoice;
   extracting, by the computer-based system, a plurality of key-value pairs from the invoice;
   generating, by the computer-based system, a structured template comprising the plurality of key-value pairs;
   forming, by the computer-based system, a feature vector;
   determining, by the computer-based system using a duplicate model and based on the feature vector, that the invoice is a duplicate of a historic invoice in a historic invoice database;
   receiving, by the computer-based system, an input to the duplicate model indicating an accuracy of the duplicate determination; and
   modifying, by the computer-based system and based on the input, the duplicate model.

2. The method of claim 1, wherein the forming the feature vector comprises concatenating similarity measures across different fields.

3. The method of claim 1, further comprising executing, by the computer-based system, a word break algorithm to segment non-space separated words which exist in a reference dictionary.

4. The method of claim 1, further comprising dividing, by the computer-based system, a plurality of bigrams in the invoice into categories consisting of (1) both words in a reference dictionary; (2) only first word in the reference dictionary; (3) only second word in the reference dictionary; and (4) neither word in the reference dictionary.

5. The method of claim 1, further comprising performing, by the computer-based system, a table parsing operation on the invoice.

6. The method of claim 1, further comprising saving, by the computer-based system, a value and location of a field in the invoice.

7. The method of claim 1, further comprising creating, by the computer-based system, a lookup dictionary comprising description keywords.

8. A system comprising:
   a processor; and
   a tangible, non-transitory memory configured to communicate with the processor, the tangible, non-transitory memory having instructions stored thereon that, in response to execution by the processor, cause the processor to perform operations comprising:
   receiving, by the processor, an invoice;
   performing, by the processor, optical character recognition on the invoice;
   extracting, by the processor, a plurality of key-value pairs from the invoice;
   generating, by the processor, a structured template comprising the plurality of key-value pairs;
   forming, by the processor, a feature vector;
   determining, by the processor using a duplicate model and based on the feature vector, that the invoice is a duplicate of a historic invoice in a historic invoice database;
   receiving, by the processor, an input to the duplicate model indicating an accuracy of the duplicate determination; and
   modifying, by the processor and based on the input, the duplicate model.

9. The system of claim 8, wherein the forming the feature vector comprises concatenating similarity measures across different fields.

10. The system of claim 8, further comprising executing, by the processor, a word break algorithm to segment non-space separated words which exist in a reference dictionary.

11. The system of claim 8, further comprising dividing, by the processor, a plurality of bigrams in the invoice into categories consisting of (1) both words in a reference dictionary; (2) only first word in the reference dictionary; (3) only second word in the reference dictionary; and (4) neither word in the reference dictionary.

12. The system of claim 8, further comprising performing, by the processor, a table parsing operation on the invoice.

13. The system of claim 8, further comprising saving, by the processor, a value and location of a field in the invoice.

14. The system of claim 8, further comprising creating, by the processor, a lookup dictionary comprising description keywords.

15. An article of manufacture including a non-transitory, tangible computer readable storage medium having instructions stored thereon that, in response to execution by a computer-based system, cause the computer-based system to perform operations comprising:

receiving, by the computer-based system, an invoice;

performing, by the computer-based system, optical character recognition on the invoice;

extracting, by the computer-based system, a plurality of key-value pairs from the invoice;

generating, by the computer-based system, a structured template comprising the plurality of key-value pairs;

forming, by the computer-based system, a feature vector;

determining, by the computer-based system using a duplicate model and based on the feature vector, that the invoice is a duplicate of a historic invoice in a historic invoice database;

receiving, by the computer-based system, an input to the duplicate model indicating an accuracy of the duplicate determination; and modifying, by the computer-based system and based on the input, the duplicate model.

16. The article of manufacture of claim 15, wherein the forming the feature vector comprises concatenating similarity measures across different fields.

17. The article of manufacture of claim 15, further comprising executing, by the computer-based system, a word break algorithm to segment non-space separated words which exist in a reference dictionary.

18. The article of manufacture of claim 15, further comprising dividing, by the computer-based system, a plurality of bigrams in the invoice into categories consisting of (1) both words in a reference dictionary; (2) only first word in the reference dictionary; (3) only second word in the reference dictionary; and (4) neither word in the reference dictionary.

19. The article of manufacture of claim 15, further comprising performing a table parsing operation on the invoice.

20. The article of manufacture of claim 15, further comprising saving, by the computer-based system, a value and location of a field in the invoice.

\* \* \* \* \*